United States Patent [19]
Yamamoto

[11] Patent Number: 5,457,446
[45] Date of Patent: Oct. 10, 1995

[54] CONTROL BUS SYSTEM WITH PLURAL CONTROLLABLE DEVICES

[75] Inventor: Yasuyuki Yamamoto, Kanagawa, Japan

[73] Assignee: Sony Corporation, Tokyo, Japan

[21] Appl. No.: 91,402

[22] Filed: Jul. 13, 1993

Related U.S. Application Data

[63] Continuation of Ser. No. 779,272, Oct. 18, 1991, abandoned.

[30] Foreign Application Priority Data

Nov. 21, 1990 [JP] Japan ................................ 2-316496

[51] Int. Cl.$^6$ .................................................. H04B 3/00
[52] U.S. Cl. .............................. 340/825.24; 340/825.25; 340/825.5
[58] Field of Search ..................... 340/825.06, 825.24, 340/825.54, 825.55, 825.07, 825.5, 825.72, 825.01, 825.25; 364/424.01

[56] References Cited

U.S. PATENT DOCUMENTS

| | | | |
|---|---|---|---|
| 4,787,040 | 11/1988 | Ames et al. ...................... | 364/424.01 |
| 4,855,730 | 8/1989 | Venners et al. ................... | 340/825.24 |
| 5,039,980 | 8/1991 | Aggers et al. ..................... | 340/825.06 |
| 5,107,256 | 4/1992 | Ueno et al. ........................ | 340/825.07 |

*Primary Examiner*—John K. Peng
*Assistant Examiner*—Andrew Hill
*Attorney, Agent, or Firm*—Jay H. Maioli

[57] ABSTRACT

A control bus system for a home entertainment system has a single bus to which there are connected various electronic or audiovisual devices including a TV tuner, a BS tuner, VTRs, a CD player, an LD player, a cassette deck, etc. The electronic devices have respective controllers which have features to be executed thereby. At least two of the electronic devices are selected so as to be connected to the single bus, and the features of the controllers of the two selected electronic devices are arranged by a feature arranging unit to prevent the same features of the controllers from conflicting on the single bus. The feature arranging unit disables at least one of the features to be executed by the controller of one of the two selected controllers if one of the features is the same as one of the features to be executed by the controller of the other of the two selected electronic devices.

1 Claim, 7 Drawing Sheets

CONTROL BUS SYSTEM WITH PLURAL CONTROLLABLE DEVICES

This is a continuation of application Ser. No. 07/779,272, filed Oct. 18, 1991, abandoned.

BACKGROUND OF THE INVENTION

1. Field of the Invention

The present invention relates to a control bus system for use in the control of audiovisual (AV) devices.

2. Description of the Prior Art

Information in a home automation system is transmitted through a control bus system. The home automatic system includes a plurality of various terminals connected to the control bus system, which is controlled by a bus controller. The bus controller controls the transmission of information to and from the terminals, and also effects an exchange of information with external information systems such as telephone lines, cable television (CATV), etc.

One recent trend of home automation is the introduction of a home entertainment system composed of various AV devices including a BS tuner, an FM tuner, a VTR, a laser disc (LD) player, a compact disc (CD) player, a digital audio tape (DAT) player, a cable television (CATV) cable terminal, for example. No problem will arise if these various AV devices are purchased under one brand name for being controlled by one bus controller. However, if a home entertainment system is composed of existing electronic devices that have already been purchased and/or electronic devices of different makes, then the system will have various problems. More specifically, these electronic devices are capable of issuing various control commands. When control commands for similar features are sent from electronic devices to one bus system simultaneously or nearly simultaneously, the bus traffic may be disturbed, the response may become slower, and the operation control process may have errors.

Figure 1:
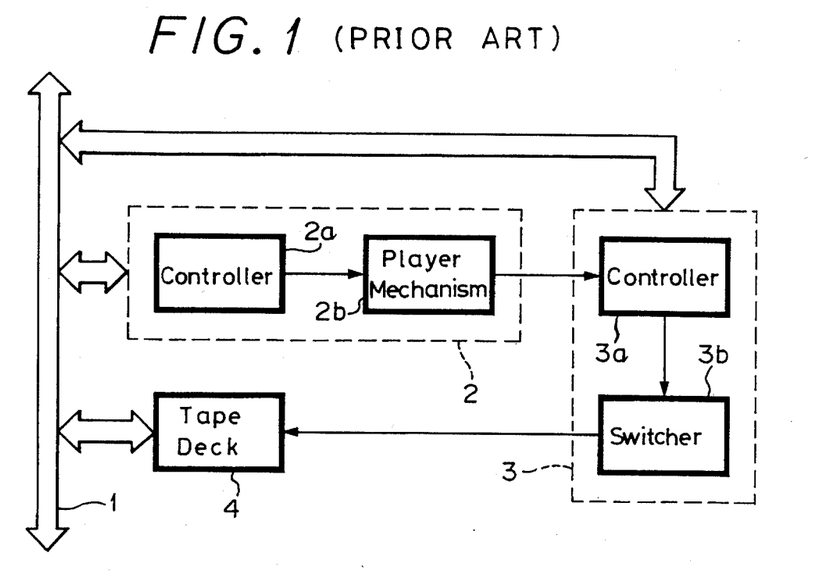
FIG. 1 is a block diagram of a conventional home entertainment system with a control bus system.

FIG. 1 of the accompanying drawings shows a conventional home entertainment system of such various electronic devices. The home entertainment system includes a CD player 2, an AV selector 3, and a tape deck 4 which are connected to a bus 1. The CD player 2 has a controller 2a and a player mechanism 2b, and the AV selector 3 has a controller 3a and a switcher 3b. When a program source played back by the CD player 2 is to be dubbed by the tape deck 4 through the AV selector 3, the bus 1 allows various functions to be performed as follows:

(a) The tape deck 4 can detect a tape end while it is dubbing the program source played back by the CD player 2.

(b) The CD player 2 can interrupt its playback mode (pause).

(c) The tape deck 4 can reverse the direction in which the tape is recorded.

(d) The CD player 2 can return from any position on a track of a music piece being played back to a point where tracks change, and start playing back the CD after elapse of a desired period of time.

It is assumed that the controllers 2a, 3a of the CD player 2 and the AV selector 3 can issue control commands for the features (c) and (d). When these control commands are transmitted from the controllers 2a, 3a to the bus 1, the tape in the tape deck 4 is reversed by the control command from the controller 2a, and then reversed again by the control command from the controller 3a, so that the tape will run in the original direction. Furthermore, the player mechanism 2b of the CD player 2 may possibly return twice to the point where tracks change. As a consequence, the operation control process suffers errors.

The above features (a) through (d) enable the tape deck 4 to dub the reproduced output signal from the CD player 2 without any dubbed music piece being interrupted.

Figure 2:
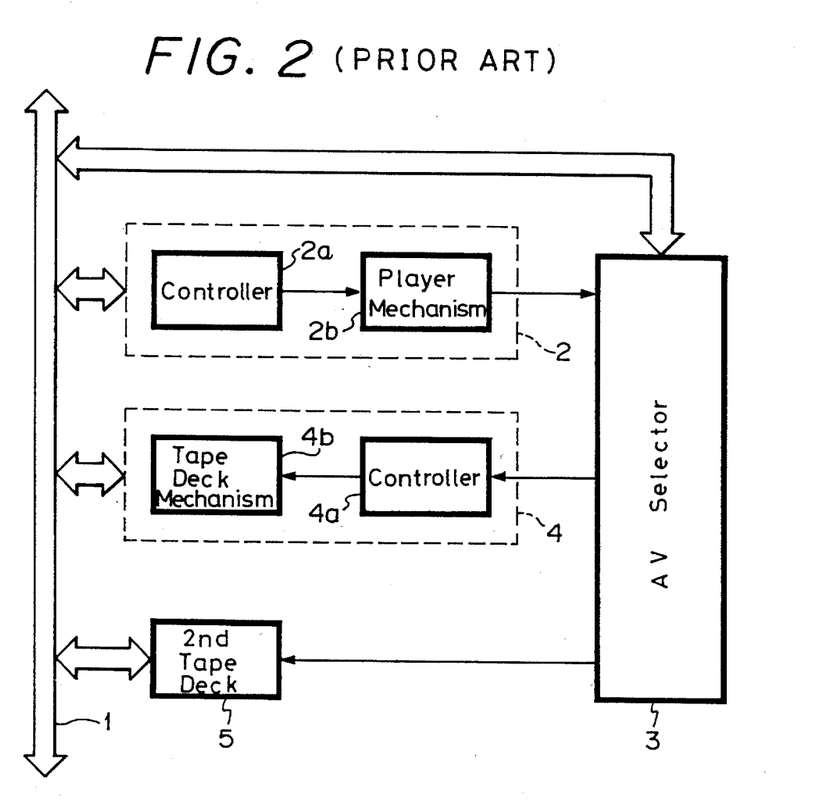
FIG. 2 is a block diagram of another conventional home entertainment system with a control bus system.

FIG. 2 shows another conventional home entertainment system composed of a CD player 2, an AV selector 3, a first tape deck 4, and a second tape deck 5. The CD player 2 comprises a controller 2a and a player mechanism 2b. The first tape deck 4 comprises a controller 4a and a tape deck mechanism 4b. The second tape deck 5 comprises only a tape deck mechanism.

In the conventional system shown in FIG. 2, when the reproduced output signal from the CD player 2 is to be dubbed by the first and second tape decks 4, 5, the controller 4a of the first tape deck 4 can recognize a dubbing signal from the CD player 2 and enter a standby mode in response to the dubbing signal. The second tape deck 5 does not have any controller, or it is assumed that even if the second tape deck 5 has a controller, the controller is incapable of recognizing such a dubbing signal. Consequently, the second tape deck 5 cannot read the dubbing command, and cannot dub the reproduced output signal from the CD player 2, resulting in an operation error.

Even when the above errors do not occur, since commands for effecting the same feature are sent to the bus 1, the bus traffic in the bus 1 is increased, and a long period of time is required until the feature is performed. Accordingly, the response of the conventional home entertainment system is poor.

OBJECTS AND SUMMARY OF THE INVENTION

In view of the aforesaid drawbacks of the conventional control bus systems, it is an object of the present invention to provide a control bus system which has feature arranging means for allowing the user or serviceman to disable unwanted features, thereby preventing operation errors from occurring and also preventing the response from being lowered.

According to the present invention, there is provided a control bus system comprising a single bus, a plurality of electronic devices connected to the single bus, the electronic devices having respective controllers, the controllers having features to be executed thereby, selecting means for selecting at least two of the electronic devices so as to be connected to the single bus, and feature arranging means for arranging the features of the controllers of the two selected controllers to prevent the same features of the controllers from conflicting on the single bus.

The feature arranging means comprises means for disabling at least one of the features to be executed by the controller of one of the two selected controllers if said one of the features is the same as one of the features to be executed by the controller of the other of the two selected electronic devices. The control bus system further comprises display means for displaying the features to be executed by the controllers of the two selected electronic devices. The display means comprises means for changing the color of the disabled feature that is displayed by the display means.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

FIGS. 3 through 6 show a home entertainment system with a control bus system according to the present invention.

Figures 3, 3A:
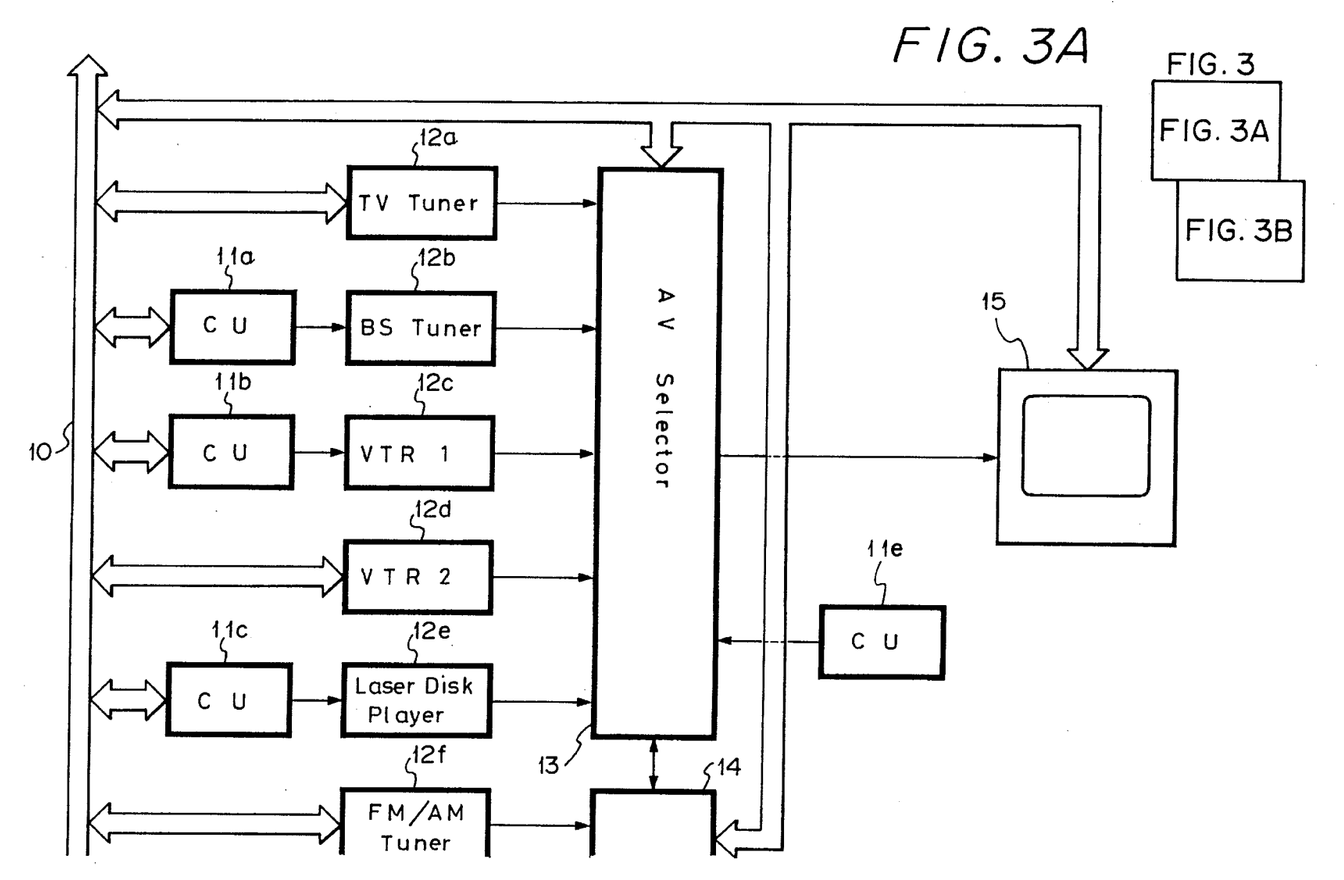
FIG. 3 is a block diagram of a home entertainment system with a control bus system according to the present invention.
Figure 3B:
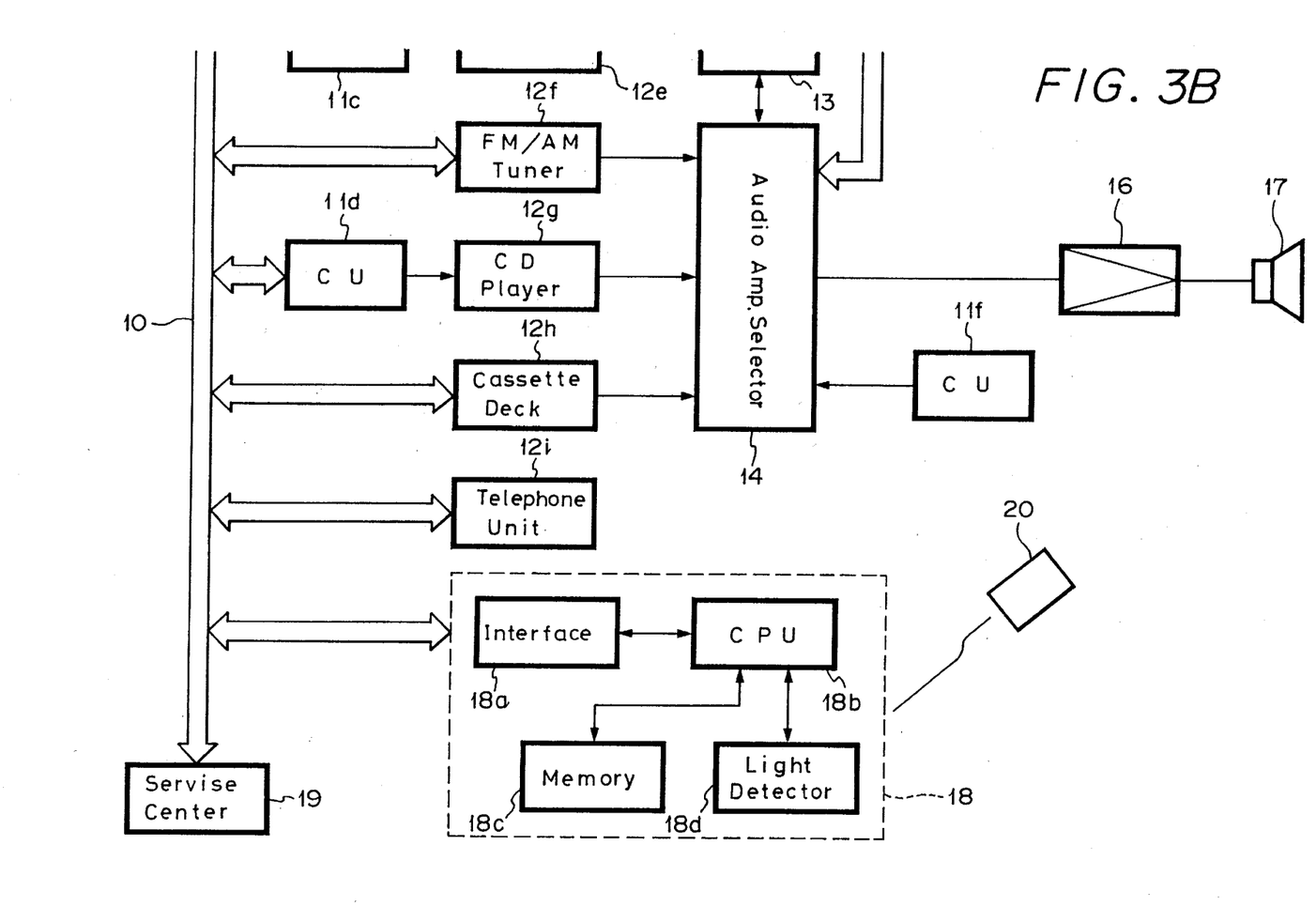

As shown in FIG. 3, the home bus entertainment system includes a plurality of AV devices that are controlled through the control bus system.

The home bus entertainment system has a bus 10 to which there are connected electronic or audiovisual devices including a TV tuner 12a, a BS tuner 12b, a first VTR 12c, a second VTR 12d, an LD player 12e, an FM/AM tuner 12f, a CD player 12g, a cassette deck 12h, and a telephone receiver/transmitter 12i. The BS tuner 12b, the first VTR 12c, the LD player 12e, and the CD player 12g have respective controllers 11a, 11b, 11c, 11d for performing various control features. The TV tuner 12a, the BS tuner 12b, the first VTR 12c, the second VTR 12d, and the LD player 12e supply output video signals through an audiovisual (AV) selector 13 to a television monitor 15 for displaying video images.

The AV selector 13 and an audio amplifier selector 14 (described later on) also have respective controllers 11e, 11f which are identical to the controllers 11a through 11c. The AV selector 13, the TV monitor 15, and the audio amplifier selector 14 are interconnected by the bus 10. Audio signals are transmitted between the AV selector 13 and the audio amplifier selector 14. The audio amplifier selector 14 selects audio signals from the FM/AM tuner 12f, the CD player 12g, and the cassette deck 12h, and then applies the selected audio signal through an amplifier 16 to a loudspeaker 17.

The telephone receiver/transmitter 12i is connected to a telephone line (not shown). The bus 10 is also connected to an external service center 19.

A feature arranging unit 18 according to the present invention is also connected to the bus 10. Commands applied to the feature arranging unit 18 can be displayed on the TV monitor 15.

In order to prevent the controllers 11a, 11b, 11c, 11d, 11e, 11f from transmitting the same features to the bus 10, the feature arranging unit 18 and the controllers 11a, 11b, 11c, 11d, 11e, 11f have the following functions:

(I) The controllers 11a, 11b, 11c, 11d, 11e, 11f are capable of answering an inquiry from the feature arranging unit 18 about how many features these controllers have.

(II) Each of the controllers 11a, 11b, 11c, 11d, 11e, 11f or the feature arranging unit 18 is capable of displaying the specific contents of indicated feature numbers.

(III) The feature arranging unit 18 is capable of disabling or starting the features of indicated feature numbers.

If necessary, the following functions may additionally be performed:

(IV) Each of the controllers 11a, 11b, 11c, 11d, 11e, 11f can experimentally execute the features of indicated feature numbers.

(V) In the case where the controllers can perform features within a limited range in the system, they can give an answer indicating the limited range in response to an inquiry.

A specific example in which the user or serviceman arranges the controller features in the system will be described below with reference to FIGS. 4 through 6.

The feature arranging unit 18 has a bus interface 18a, a microcomputer (CPU) 18b, a memory 18c, and a light detector 18d. The feature arranging unit 18 arranges the features based on commands from a commander 20.

Figure 4:
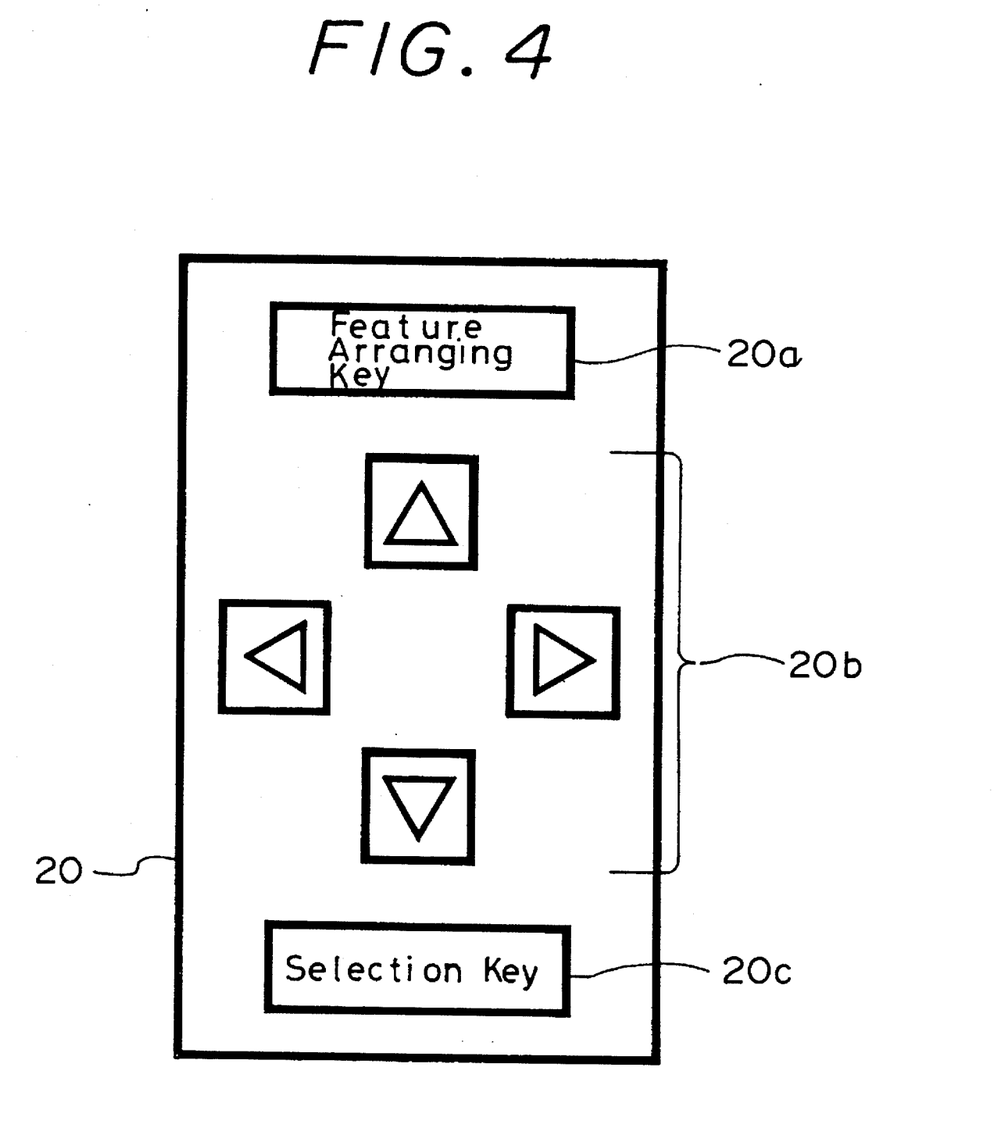
FIG. 4 is a plan view of a commander in the home entertainment system shown in FIG. 3.
Figure 5A:
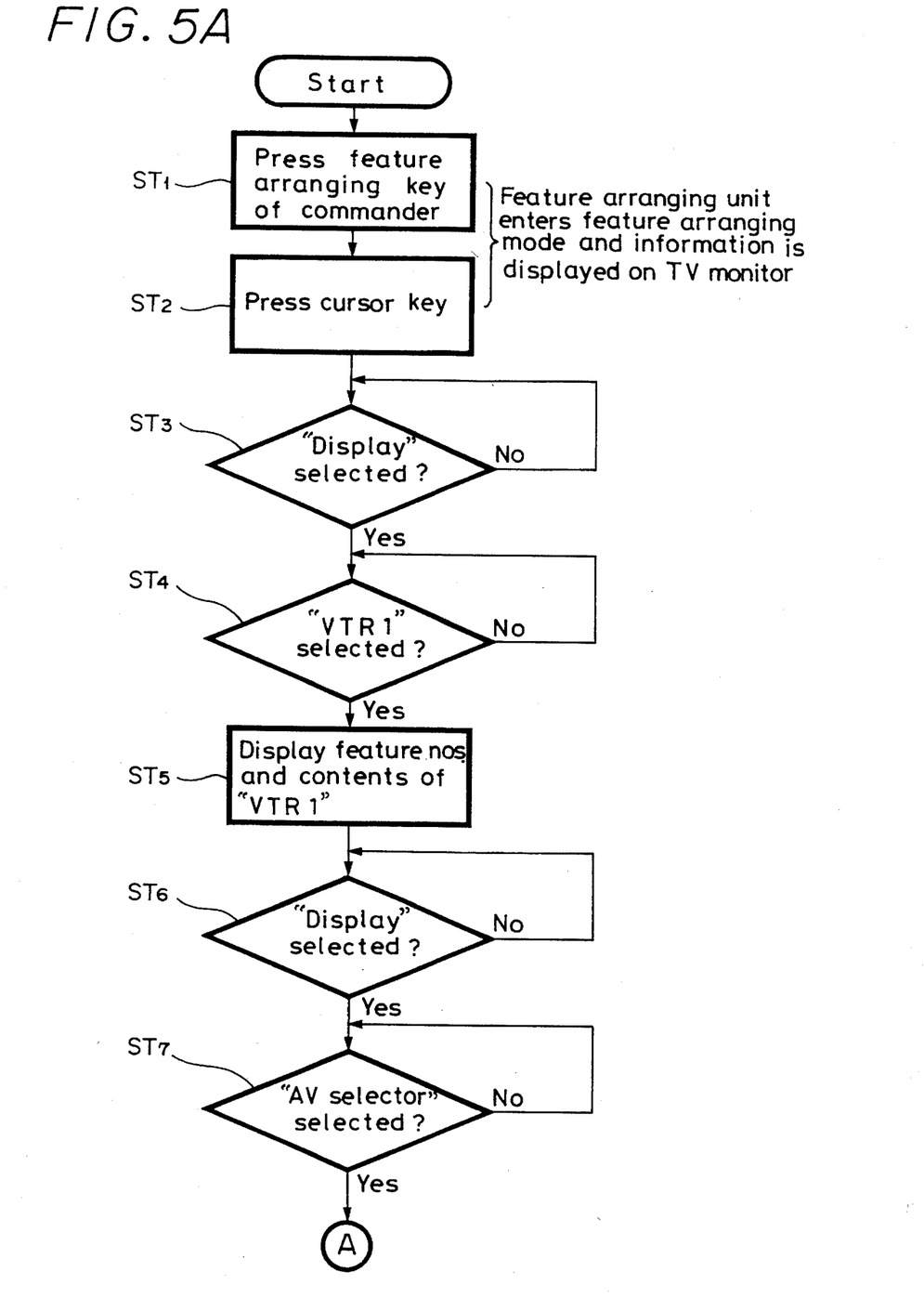
FIG. 5 is a flowchart of an operation sequence of the control bus system shown in FIG. 3.
Figure 5B:
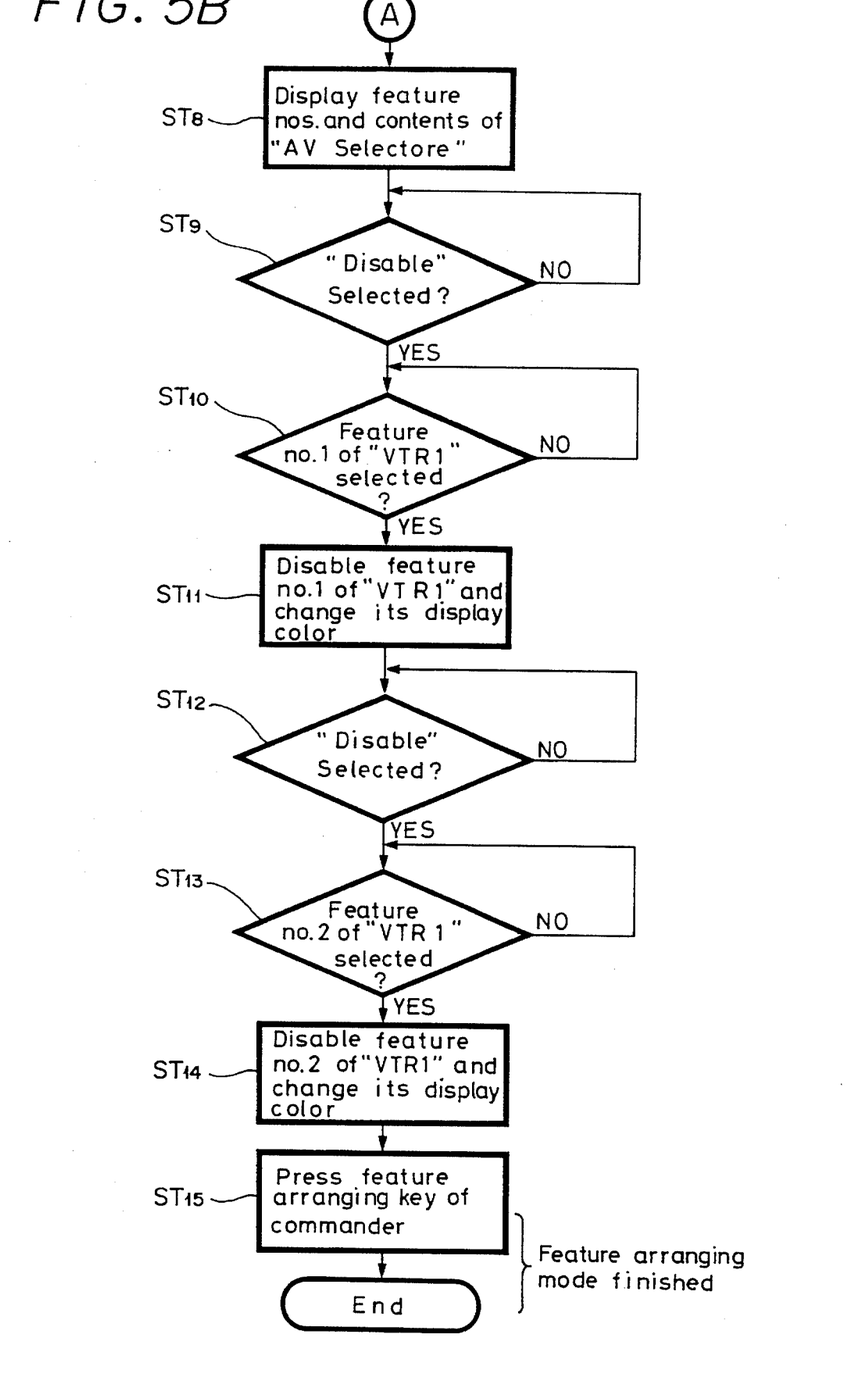

FIG. 4 shows control keys on the commander 20. The control keys include a feature arranging key 20a for selecting a feature arranging mode, a group of cursor keys 20b for moving a cursor vertically and horizontally to items displayed on the screen of the TV monitor 15, and a selection key 20c for selecting the displayed items.

It is now assumed that when one of the VTRs is controlled, the control bus system operates with a slow response. An operation sequence to check the slow response of the control bus system will be described below with reference to FIG. 5.

Figure 6:
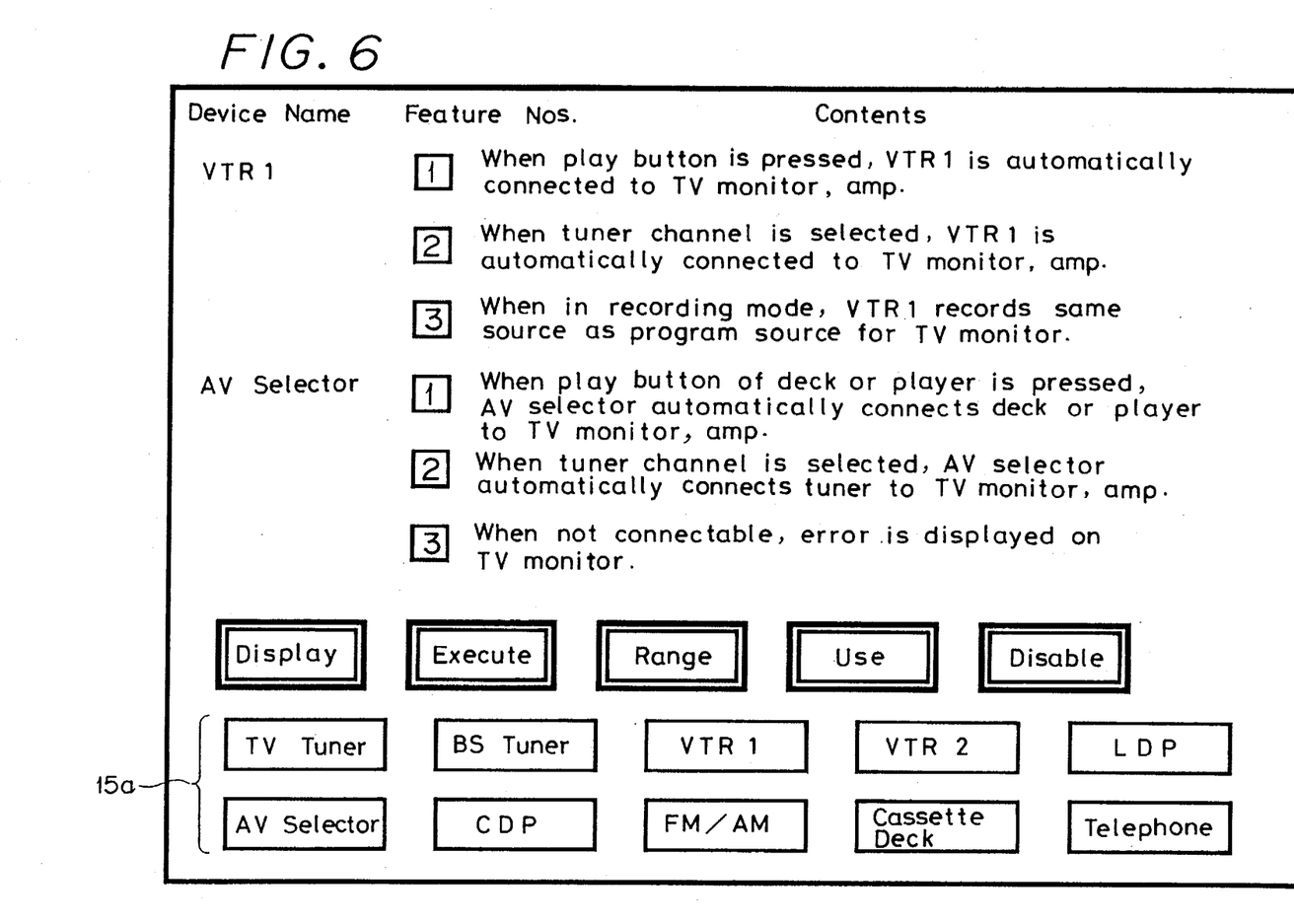
FIG. 6 is a diagram showing, by way of example, messages displayed on a TV monitor in the home entertainment system shown in FIG. 3.

When the feature arranging key 20a of the commander 20 is pressed in a step ST1, the feature arranging unit 18 enters a feature arranging mode in which it displays information indicative of all the audiovisual devices, such as shown at 15a in FIG. 6, on the TV monitor 15 through the bus 10.

Then, the cursor displayed on the TV monitor 15 is moved to the displayed item "DISPLAY" by the user or serviceman using the cursor keys 20b on the commander 20, and the selection key 20c is pressed in a step ST2. The CPU 18b determines whether "DISPLAY" is selected or not in a step ST3. If "DISPLAY" is selected, then the CPU 18b waits for a next cursor movement. When the cursor is moved to the displayed item "VTR1" on the TV monitor 15 using the cursor keys 20b, the CPU 18b determines whether displayed item "VTR1" is selected or not in a step ST4. If displayed item "VTR1" is selected, then the feature numbers (Nos.) and the contents thereof are displayed on the TV monitor 15 in a step ST5. Specifically, the device name "VTR1," the feature NOs. (1), (2), (3), and the contents thereof are displayed as shown in FIG. 6. Then, the cursor is moved to displayed item "DISPLAY" using the cursor key 20b, and the selection key 20c is pressed. The CPU 18b determines whether the displayed item "DISPLAY" is selected or not in a step ST6. If selected, then the CPU 18b waits for a next cursor movement. The cursor is moved to the displayed item "AV SELECTOR" using the cursor key 20b, and the selection key 20c is pressed. The CPU 18b determines whether the displayed item "AV SELECTOR" is selected or not in a step ST7. If selected, then the feature numbers (Nos.) and the contents thereof are displayed on the TV monitor 15 in a step ST8. Specifically, the device name "AV SELECTOR," the feature NOs. (1), (2), (3), and the contents thereof are displayed as shown in FIG. 6.

In the illustrated example, the features (1), (2) of the device "VTR1" and the features (1), (2) of the device "AV SELECTOR" are identical to each other. To avoid possible confusion, the features (1), (2) of the device "VTR1" or the "AV SELECTOR" are disabled. By way of example, a procedure for disabling the features (1), (2) of the device "VTR1" will be described below. The cursor is moved to displayed item "DISABLE" using the cursor key 20b, and the selection key 20c is pressed. The CPU 18b determines whether displayed item "DISABLE" is selected or not in a step ST9. If selected, then the CPU 18b waits for a next cursor movement. The cursor is moved to the feature (1) of "VTR1" using the cursor key 20b, and the selection key 20c is pressed. The CPU 18b determines whether the feature (1) of "VTR1" is selected or not in a step ST10. If selected, then the feature (1) of the first VTR 12c is disabled, and the displayed color of the feature (1) and the contents thereof on the TV monitor 15 is changed in a step ST11.

Then, the cursor is moved to displayed item "DISABLE" using the cursor key 20b, and the selection key 20c is pressed. The CPU 18b determines whether displayed item "DISABLE" is selected or not in a step ST12. If selected, then the CPU 18b waits for a next cursor movement. The user or serviceman moves the cursor to the feature (2) of "VTR1" using the cursor key 20b, and presses the selection key 20c. The CPU 18b determines whether the feature (2) of "VTR1" is selected or not in a step ST13. If selected, then the feature (2) of the first VTR 12c is disabled, and the displayed color of the feature (2) and the contents thereof on the TV monitor 15 is changed in a step ST14. The user or serviceman can easily recognize that the features (1), (2) are now disabled, because they are now displayed in a different color. Then, the feature arranging key 20a is pressed again to finish the feature arranging mode in a step ST15.

Since the features (1), (2) that the controller 11b of the first VTR 12c has are disabled and the corresponding commands are not sent to the bus 10, the bus traffic is prevented from increasing, and possible operation errors can be avoided.

The displayed item "EXECUTE" shown in FIG. 6 is used to select a certain electronic device and its feature Nos., and experimentally execute the features thereof if the selected device is under executable system condition. The displayed item "RANGE" is used to select electronic devices, and display the electronic devices in reverse if their controllers effect a service in a limited range. The displayed item "USE" selects an electronic device and its feature Nos. and starts to use the features if they have been disabled.

In the above embodiment, the features are arranged by the user or serviceman using the feature arranging unit 18. Since the above process is rather complex for the general user, the telephone unit 12i may be connected to the external service center 19, and the functions of the control bus system may be transmitted to the service center 19 so that the features can be arranged professionally at the service center 19.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A control bus system comprising:

a single bus;

a plurality of electronic devices connected to said single bus;

selecting means for selecting at least two of said plurality of electronic devices for operation;

said electronic devices having respective controllers, said controllers each issuing commands to respective devices for causing functions to be executed by said respective devices;

display means connected to said single bus for displaying at least the functions to be executed by the controllers of said at least two selected electronic devices; and function arranging means connected to said single bus for controlling via commands on said single bus said display means and the functions to be executed by the respective controllers of said at least two selected electronic devices and including means for disabling at least one of the functions to be executed by the controller of one of said selected electronic devices if at least one of the functions is the same as one of the functions to be executed by the controller of the other of said at least two selected electronic devices and issuing a command via said single bus to update said display means by using a different color for the disabled functions, wherein said function arranging means acquires from a controller of any one of said at least two selected electronic devices information related to functions that said controller of said one of said at least two selected electronic devices is capable of performing by issuing an inquiry command for said information via said single bus to said controller of said one of said at least two selected electronic devices and receiving said information from said controller of said one of said at least two selected electronic devices via said single bus, and said information includes the functions that said controller of said one of said at least two selected electronic devices is capable of performing and a range of operation corresponding to each of the functions that said controller of said one of said at least two selected electronic devices is capable of performing.

* * * * *